(12) United States Patent
Miao (10) Patent No.: US 9,707,941 B2
(45) Date of Patent: Jul. 18, 2017

(54) ADJUSTABLE AUXILIARY BRAKE CONTROL SYSTEM

(71) Applicant: Siman Miao, Calgary (CA)

(72) Inventor: Siman Miao, Calgary (CA)

(73) Assignee: Siman Miao, Calgary, Alberta (CA)

( * ) Notice: Subject to any disclaimer, the term of this patent is extended or adjusted under 35 U.S.C. 154(b) by 336 days.

(21) Appl. No.: 14/250,865

(22) Filed: Apr. 11, 2014

(65) Prior Publication Data

US 2014/0311276 A1 Oct. 23, 2014

Related U.S. Application Data

(60) Provisional application No. 61/812,997, filed on Apr. 17, 2013, provisional application No. 61/828,182, filed on May 29, 2013.

(51) Int. Cl.
*G05G 1/34* (2008.04)
*B60T 7/06* (2006.01)

(52) U.S. Cl.
CPC ............... *B60T 7/06* (2013.01); *G05G 1/34* (2013.01); *Y10T 74/20528* (2015.01)

(58) Field of Classification Search
CPC .... B60T 7/04; B60T 7/06; G05G 1/34; Y10T 74/20528
See application file for complete search history.

(56) References Cited

U.S. PATENT DOCUMENTS

| | | |
|---|---|---|
| 2,599,376 A | 6/1952 | Ehrenberg |
| 2,710,547 A | 6/1955 | Davenport |
| 2,720,121 A | 10/1955 | Holum |
| 3,174,359 A | 3/1965 | Rose |
| 3,943,795 A | 3/1976 | Kenney |
| 4,312,246 A | 1/1982 | Barresi |
| 5,564,314 A * | 10/1996 | Gabas ............ F16C 1/226 74/500.5 |
| 7,207,238 B2 | 4/2007 | Feng |

FOREIGN PATENT DOCUMENTS

| | | | | |
|---|---|---|---|---|
| BE | 1010871 A6 | * | 2/1999 | ............ G05G 1/34 |
| CN | 201254171 Y | | 6/2009 | |
| CN | 201494423 U | | 6/2010 | |
| CN | 201597587 U | | 10/2010 | |
| CN | 203410443 U | | 1/2014 | |
| DE | DE 4116924 A1 | * | 11/1992 | ............ G05G 1/34 |
| JP | 09315273 A | * | 12/1997 | |
| JP | 2001310712 A | * | 11/2001 | |
| JP | 2004230986 A | * | 8/2004 | |
| SE | 503019 C2 | | 2/1996 | |

OTHER PUBLICATIONS

Machine translation of CN 203410443 U obtained on Jun. 28, 2016.*
Machine translation of CN 201254171 Y obtained on Jul. 19, 2016.*
Machine translation of CN 201494423 U obtained on Jul. 19, 2016.*

* cited by examiner

*Primary Examiner* — Adam D Rogers (57) ABSTRACT

An adjustable auxiliary brake control system for an educational driving vehicle with a main brake and a driver seat comprises an auxiliary brake assembly, a connecting frame, a supporting structure and a brake cable. The system attains strong and reliable support from a driver-seat-bracket to achieve auxiliary brake control from the passenger compartment through the brake cable. The system is easy to install and uninstall, universally fits to variable vehicle models, and has a non-damaging installation process.

9 Claims, 13 Drawing Sheets

ADJUSTABLE AUXILIARY BRAKE CONTROL SYSTEM

CROSS-REFERENCE TO RELATED APPLICATIONS

This application claims the benefit of U.S. Provisional Patent Application Ser. Nos. 61,812,997, filed on Apr. 17, 2013 (Adjustable Auxiliary Brake Control System), and 61,828,182, filed on May 29, 2013 (Adjustable Auxiliary Brake Control System).

FEDERALLY SPONSORED RESEARCH

Not Applicable

SEQUENCE LISTING OR PROGRAM

Not Applicable

STATEMENT REGARDING PRIOR DISCLOSURES BY THE INVENTOR OR A JOINT INVENTOR

This application is related to my patent C.N. 203,410,443 U, filed on Aug. 24, 2013, granted on Jan. 29, 2014 (An auxiliary braking device for an automobile), which is incorporated by reference.

FIELD OF THE INVENTION

The present invention relates to an auxiliary brake control system for educational driving vehicles.

BACKGROUND OF THE INVENTION

People learn driving skills mainly from driving schools, which provide vehicles equipped with dual brake systems. An alternative way is to drive a non-driving-school vehicle under the supervision of any qualified individual. However, non-driving-school-vehicles are rarely installed with dual brake systems, which are either costly or complicated. Therefore, it is not a safe practice to drive such a vehicle without a dual brake system.

In the past decades, many approaches have been suggested to provide dual brake systems. Nevertheless, several disadvantages exist in earlier prior arts, which include: inability of being mounted in variable vehicle models, complexity of installation and structural damage.

One approach utilizes elongated rods, cables or the like, which are built on floor-mounted brackets either in the driver or passenger compartment. The mechanisms of such dual brake systems could be reflected in prior inventions by way of examples in U.S. Pat. No. 2,710,547 (A. F. Davenport, Jun. 14, 1955), U.S. Pat. No. 3,174,359 (J. I. Rose, Mar. 23, 1965), U.S. Pat. No. 3,943,795 (F. T. Kenney, Mar. 16, 1976) and in S.E. Pat. No. 503,019 (R. Magnusson, et al, Feb. 26, 1996). Though these devices might be effective, one apparent drawback would not be welcomed by customers. To mount the brackets, the floor board must be drilled through or welded, which can cause structural damage to the vehicle.

To avoid structural damage to vehicles, some inventors propose frames or brackets to support the braking apparatus without drilling or welding. For example, I. J. Ehrenberg, in U.S. Pat. No. 2,599,376 (published on Jun. 3, 1952), places a series of supporting brackets on the floor board in the passenger compartment. E. B. Holum, in U.S. Pat. No. 2,720,121 (published on Oct. 11, 1955), secures two jacks to the floor board and the lower edge of a dashboard. Similarly, Z. V. Barresi, in U.S. Pat. No. 4,312,246 (published on Jan. 26, 1982), discloses a system by placing supporting structures under the dashboard in the passenger compartment. These prior arts include some elongated control parts installed transversely under the dashboard, which are hardly compatible with present day vehicles.

A further attempt to avoid structural damage to vehicles is disclosed by Z. Feng, in an auxiliary brake control system in U.S. Pat. No. 7,207,238 (published on Apr. 24, 2007). Nevertheless, several disadvantages are apparent in the prior art. Firstly, one of the vital supporting structures in the system is deeply mounted on a bracket at the base of a brake master cylinder under the dashboard. There is great technical difficulty in installing such a device well below the dashboard. Secondly, the prior art entirely relies on a "typical" bracket of the cylinder to establish a support. In fact, the structure of the cylinder can be varied from model to model, and some vehicles do not have a "typical" supporting bracket suitable for the system to be mounted on. Therefore, the system would not be universally fitted to different vehicle models. More importantly, to help the brake arm return to its normal rest position, a compression spring is placed under the brake arm. The compression spring will increase the resistance of the normal brake, as a result, it would impair the brake function.

In recent years, J. Liu and Y. Liu in CN Pat No. 201,597,587 (published on Oct. 6, 2010), develop an easy-to-install hydraulic device to attain brake control. There are some disadvantages in the device. The main drawback is oil leakage, which can cause mechanical failure. Meanwhile, the apparatus, placed high above the floor board of the driver compartment, will be an inconvenience to a driver when getting in and out of the vehicle.

Some other easy-to-install devices have been invented, which can be revealed by way of examples in CN Pat. No. 201,254,171 (C, Xu, Jun. 10, 2009), and CN Pat. No. 201,494,423 (Sh, Shi, Jun. 2, 2010). Nevertheless, the supporting brackets of these devices are insecurely placed on the floor board in the driver compartment and against the front surface of the driver seat; displacement could occur and result in mechanical failure as well. It would be a risk to use such a device which lacks a secured and reliable support.

Establishing a supporting point is a fundamental step in constructing an auxiliary brake control system. The approaches in prior arts to establish a supporting point have disadvantages aforementioned. To design an ideal auxiliary brake control device for an educational driving vehicle, the drawbacks of the prior arts must be overcome.

Therefore, one object of the present invention is to provide the advantages of an auxiliary brake control system which can be widely adapted to different vehicle models.

Another object of the present invention is to provide the advantages of an auxiliary brake control system which is easy to install and uninstall.

Another object of the present invention is to provide the advantages of a securely installed device.

A further object of the present invention is to provide such a system without any structural damage to vehicles for installation.

In the present art, the main parts involved in this device include: a piece of brake cable, an adjustable connecting frame, an unique designed adjustable supporting structure, and an auxiliary brake assembly.

The supporting structure of the device is attached to a driver-seat-bracket, which is an essential component to anchor the driver seat on the floor board of a vehicle and is in an easy-reach position. The present art has the advantages of providing strong and reliable support, being easy to install and uninstall, and having a non-damaging installation process. The adjustable designs make it possible for the system to be a universal brake assisting device for variable vehicle models.

BRIEF SUMMARY OF THE INVENTION

A primary object of the present invention is to provide an adjustable auxiliary brake control system for an educational driving vehicle, which is easy to install without a structurally damaging process.

The adjustable auxiliary brake control system in the present invention comprises an auxiliary brake assembly, a connecting frame, an adjustable supporting structure, and a brake cable.

In accordance with one embodiment, the auxiliary brake assembly includes a base, and an auxiliary brake pedal pivotably attached the base.

In accordance with one specific embodiment of the invention, the connecting frame is mounted on the main brake as a linkage between the main brake and the auxiliary brake assembly. The connecting frame also serves as a transverse extension of the main brake on the left, such that the supporting structure can be placed left to the main brake along a floor board of the vehicle to avoid disturbance to a driver.

In accordance with one specific aspect of the invention, the supporting structure is installed on a driver-seat-bracket of the vehicle to support brake force from the auxiliary brake assembly. The supporting structure comprises: a front bracket, an intermediate bracket, and a rear bracket. The intermediate bracket connects the front and rear brackets and adjusts the length of the supporting structure, such that the auxiliary brake control system can be adapted to different vehicle models. The rear bracket is mounted on the driver-seat-bracket, whereby the supporting structure can be adapted to any vehicle having the driver-seat-bracket mounted on the floor board directly.

Viewed from another aspect and in accordance with a particular embodiment of the invention, the rear bracket can also be mounted on the driver-seat-bracket through a connecting bracket, such that the supporting structure can be adapted to any vehicle with the driver-seat-bracket mounted on the floor board indirectly through a frame.

In accordance with one aspect of the invention, the auxiliary brake assembly controls the main brake from the passenger compartment through the brake cable. The brake cable includes an outer sheath and an inner cable. A first end of the outer sheath is connected to the supporting structure, and a second end of the outer sheath is connected to the base. Meanwhile, the inner cable slides within the outer sheath with a first end secured to the connecting frame, and a second end secured to the auxiliary brake pedal, whereby when the auxiliary brake pedal is depressed followed by a movement of the inner cable, the brake force will be applied on the main brake such that the main brake is pulled downwardly to fulfill a brake action.

In a particularly advantageous aspect of the invention, the second end of the inner cable is surrounded by an extension spring, whereby the spring will maintain the auxiliary brake pedal in a rest position when the auxiliary brake pedal is not depressed, and will help the inner cable return into the outer sheath such that the auxiliary brake pedal and the main brake will return to rest positions without delay when the depressed auxiliary brake pedal is released.

DETAILED DESCRIPTION OF THE INVENTION

Before explaining at least one embodiment of the present invention in detail, it is to be understood that the invention is not limited in its application to the details of the particular arrangement shown, since the invention is capable of other embodiments. Also, the terminology employed herein is for the purpose of description and should not be regarded as limiting. In the following description, the terms of direction, "front" and "rear", are used with reference to the front and rear of the vehicle itself; and "left" and "right" are respectively referred to the left and right sides of a driver sitting in a driver seat.

It will be illustrated that the auxiliary brake control system is mainly applied to a braking system. With the same spirit of art, the system may as well be applied to clutching systems and accelerating systems involving controls by pedals.

Figure 1:
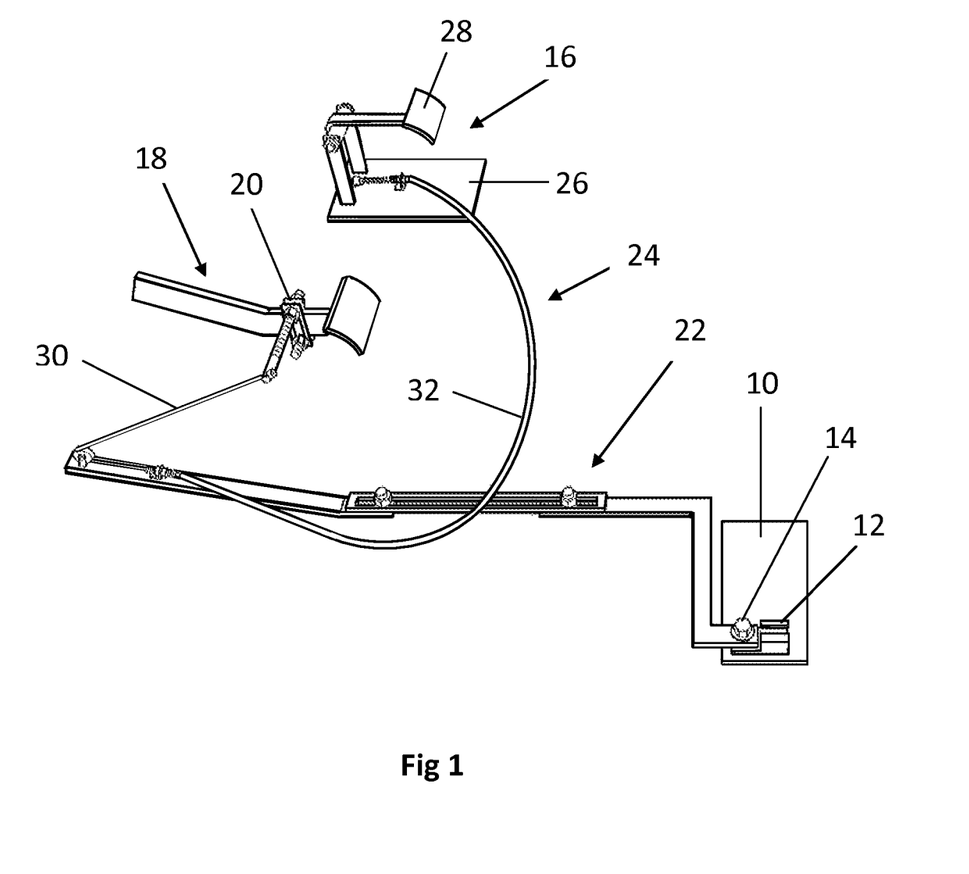
FIG. 1 is a perspective view of a first embodiment of an auxiliary brake control system.

FIG. 1 is an overall view of a first embodiment of an adjustable auxiliary brake control system. As in a conventional vehicle, there is a driver seat (not shown) anchored to a floor board 10 directly through a driver-seat-bracket 12 by a bolt 14 in each corner. In this embodiment, the auxiliary brake control system comprises: an auxiliary brake assembly 16 to control a main brake 18 of the vehicle from the passenger compartment; a connecting frame 20 installed on an arm of the main brake 18; a supporting structure 22 mounted on the driver-seat-bracket 12 on the left; and a brake cable 24 to link the brake assembly 16 and the main brake 18. The auxiliary brake assembly 16 includes: a base 26 and an auxiliary brake pedal 28. The brake cable 24 includes: an inner cable 30 and an outer sheath 32. A first end of the outer sheath 32 is mounted on the supporting structure 22 with a second end on the base 26. A first end of the inner cable 30 is attached to the connecting frame 20 with a second end on the brake pedal 28.

Figure 2:
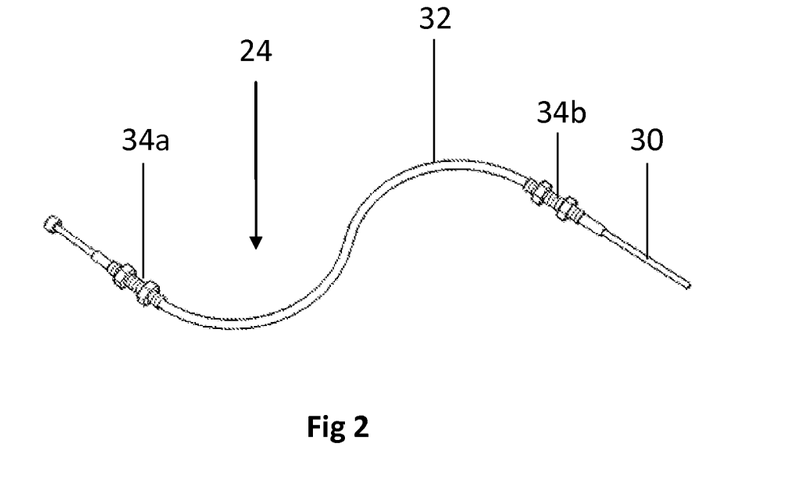
FIG. 2 is a perspective view of a commercially available brake cable.

FIG. 2 shows the brake cable 24 which is a commercially available Bowden cable. The first and second ends of the outer sheath 32 include a first and a second threaded tubes 34a and 34b respectively. The inner cable 30 extends past the outer sheath 32 on both ends, and slides smoothly along a cable housing (not shown) within the outer sheath 32.

Figure 3:
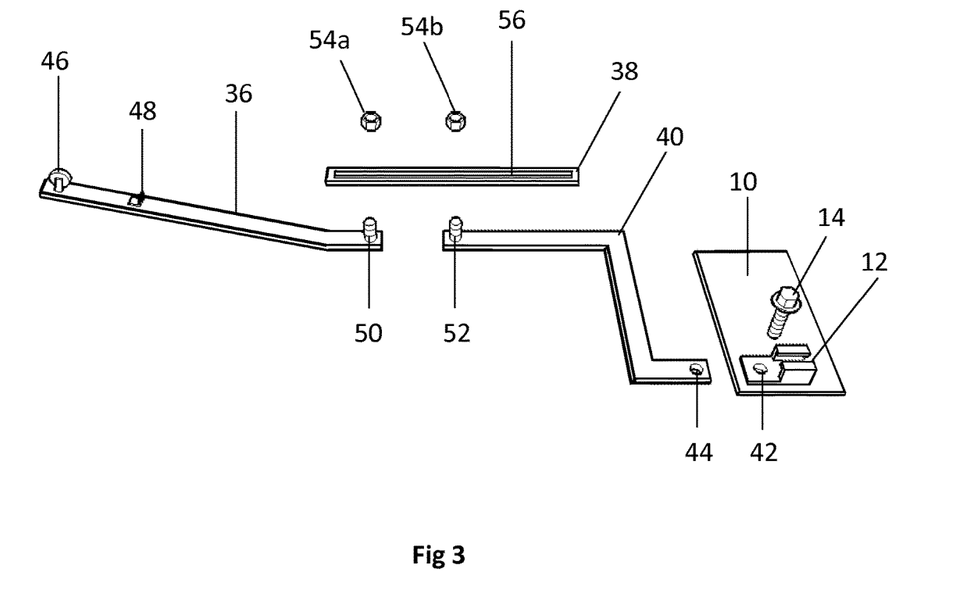
FIG. 3 is a perspective view of a first embodiment of a supporting structure.

FIG. 3 illustrates a first embodiment of the supporting structure 22, which includes: a front bracket 36, an intermediate bracket 38 and a rear bracket 40. In this embodiment, the rear bracket 40 is a left-turning bracket with an extended part on its left end. To install the supporting structure 22 on the driver-seat-bracket 12, the bolt 14 has to be removed from a hole 42 through the driver-seat-bracket 12 and the floor board 10. The rear bracket 40 will be mounted on the driver-seat-bracket 12 on the left side by the bolt 14 through a hole 44 in the extended part and the hole 42.

Referring to FIG. 3, the front bracket 36 is bent upwardly to be adapted to an inclined floor board (not shown). The front bracket 36 includes a fixed pulley 46, a bored plate 48 and a first bolt 50 attached to its front, medial and rear portion respectively. The rear bracket 40 includes a second bolt 52 on its front portion. The intermediate bracket 38 will connect the brackets 36 and 40 by the first bolt 50 and the second bolt 52 with nuts 54a and 54b through a slot 56 in the bracket 38. The intermediate bracket 38 will adjust the length of the supporting structure 22.

As the position of the driver-seat-bracket 12 may be varied in different vehicle models, and the supporting structure 22 can be mounted on the driver-seat-bracket 12 on the left or the right, several variations of the supporting structure 22 are possible.

Figure 4:
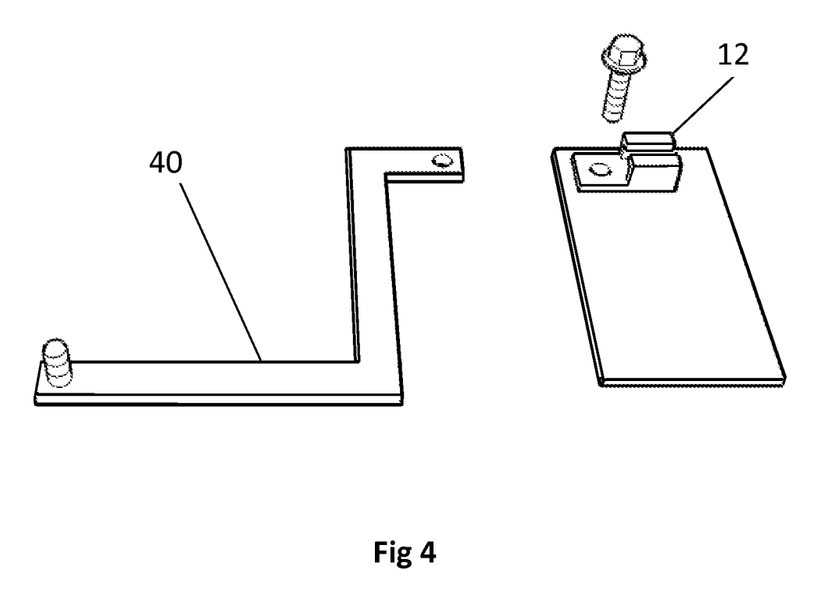
FIG. 4 is a perspective view of a second embodiment of a supporting structure.

FIG. 4 is a second embodiment of the supporting structure 22. In this embodiment, the rear bracket 40 is a right-turning bracket, which will be mounted on the driver-seat-bracket 12 on the right.

FIGS. 5, 6, 7 and 8 disclose solutions for any vehicle with a driver seat anchored to the floor board 10 indirectly through a frame 58.

Figure 5:
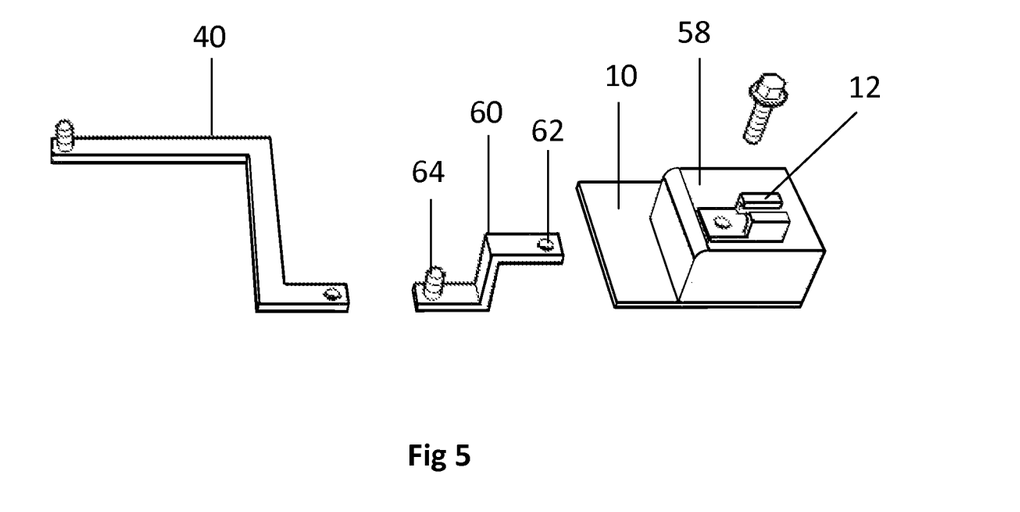
FIG. 5 is a perspective view of a third embodiment of a supporting structure.
Figure 6:
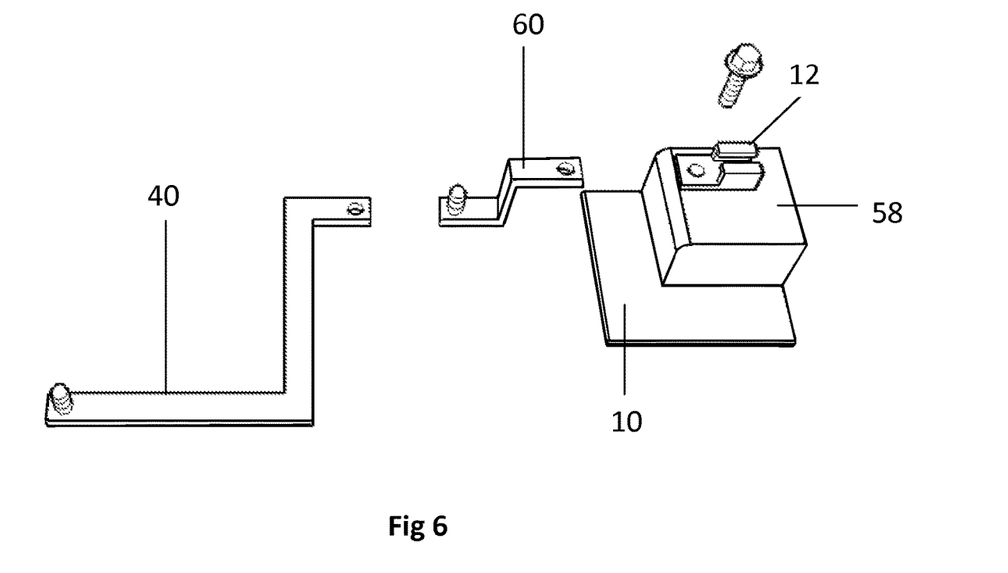
FIG. 6 is a perspective view of a fourth embodiment of a supporting structure.

Accordingly, FIG. 5 is a third embodiment of the supporting structure 22. In this embodiment, a connecting bracket 60 with a hole 62 in its top piece and a bolt 64 on its bottom piece will connect the brackets 40 and 12 on the left. Through the connecting bracket 60, the supporting structure 22 will be kept on the floor board 10. Similarly, FIG. 6 discloses a fourth embodiment of the supporting structure 22. In this embodiment, the rear bracket 40 is a right-turning bracket. Through the connecting bracket 60, the brackets 40 and 12 will be joined together on the right.

Figure 7:
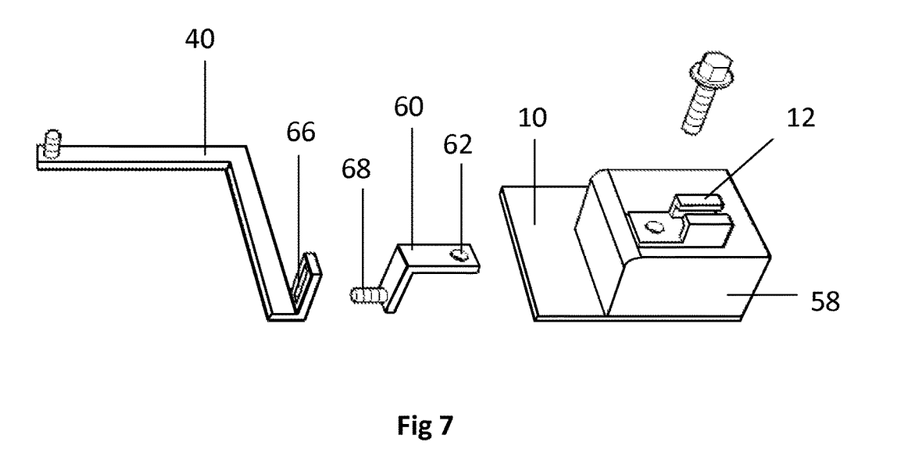
FIG. 7 is a perspective view of a fifth embodiment of a supporting structure.
Figure 8:
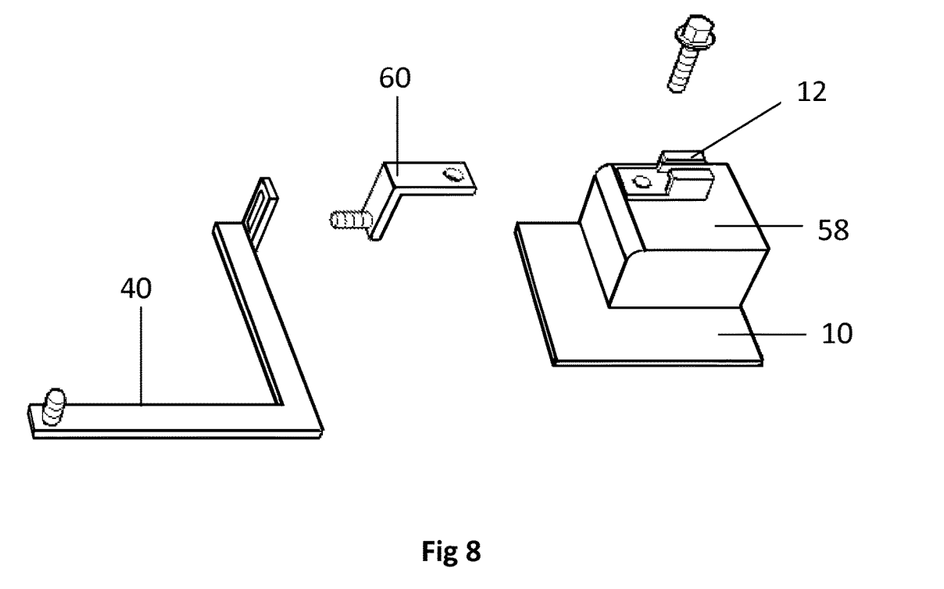
FIG. 8 is a perspective view of a sixth embodiment of a supporting structure.

FIG. 7 is a fifth embodiment of the supporting structure 22. In this embodiment, the rear bracket 40 is a left-turning bracket with a slot 66 in its upward rear piece. The connecting bracket 60 is a modified form with a bolt 68 on its vertical piece. Through the bolt 68 and the hole 62, the brackets 40 and 12 will be joined together by the connecting bracket 60 on the left. Comparatively, FIG. 8 displaces a sixth embodiment of the supporting structure 22. In this embodiment, the rear bracket 40 is a right-turning bracket. Through the connecting bracket 60, the brackets 40 and 12 will be joined together on the right.

Figure 9:
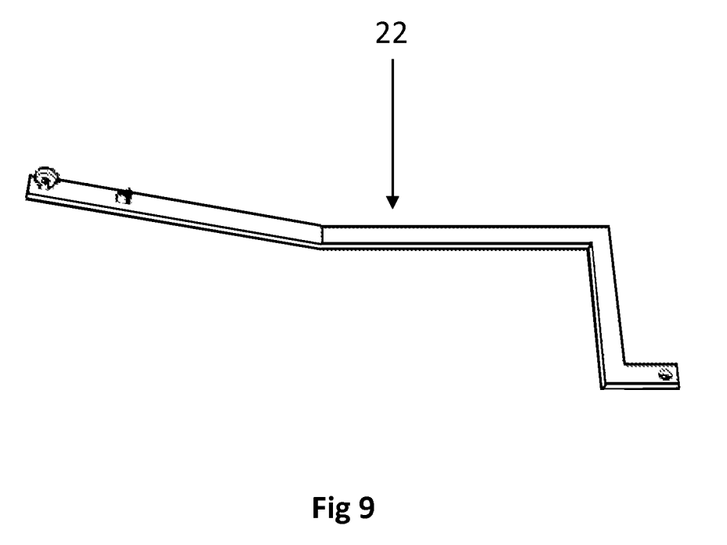
FIG. 9 is a perspective view of an additional embodiment of a supporting structure.

FIG. 9 is an additional embodiment of the supporting structure 22. In this embodiment, the three brackets 36, 38 and 40 or the modified forms aforementioned are integrated into a whole piece.

Figure 10A:
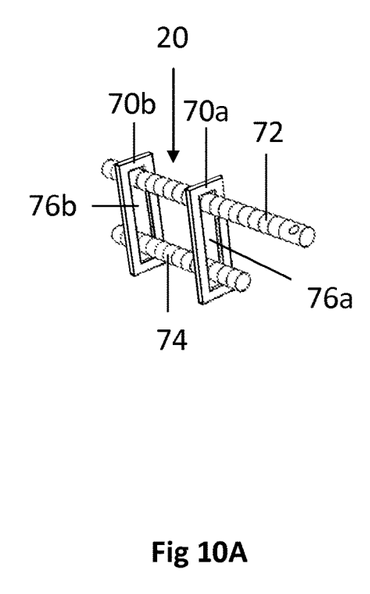
FIGS. 10A and 10B are perspective views of a first embodiment of a connecting frame.
Figure 10B:
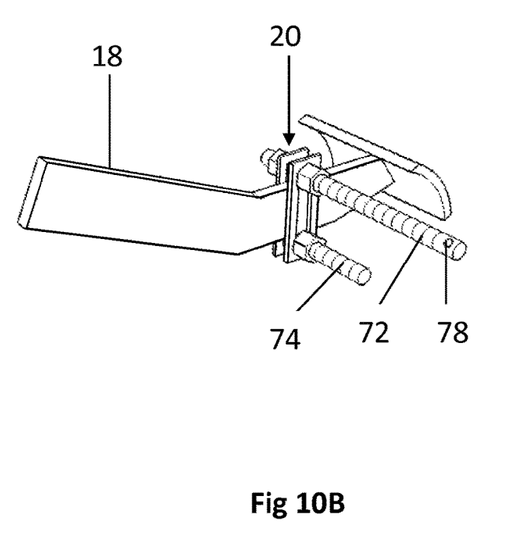

FIGS. 10A and 10B illustrate the connecting frame 20 on the main brake 18, which includes: a first plate 70a, a second plate 70b, a first bolt 72 and a second bolt 74. The bolts 72 and 74 go through a slot 76a in the plate 70a and a slot 76b in the plate 70b to form the connecting frame 20 (FIG. 10A). The connecting frame 20 rides on the arm of the main brake 18 with the bolts 72 and 74 being placed above and under the arm respectively. The bolts 72 and 74 are adjusted and fastened by nuts, such that the connecting frame 20 can be an integrated part of the main brake 18 and the bolt 72 can be a transverse extension of the main brake 18 on the left (FIG. 10 B). The bolt 72 has a mounting hole 78 in its left end, through which one end of the inner cable 30 will be attached to the bolt 72. The connecting frame 20 will serve as a linkage between the main brake 18 and the auxiliary brake control system. The slidable feature of the bolts and slots makes the connecting frame 20 adaptable to variable types of the main brake 18 in different vehicle models.

Figure 11:
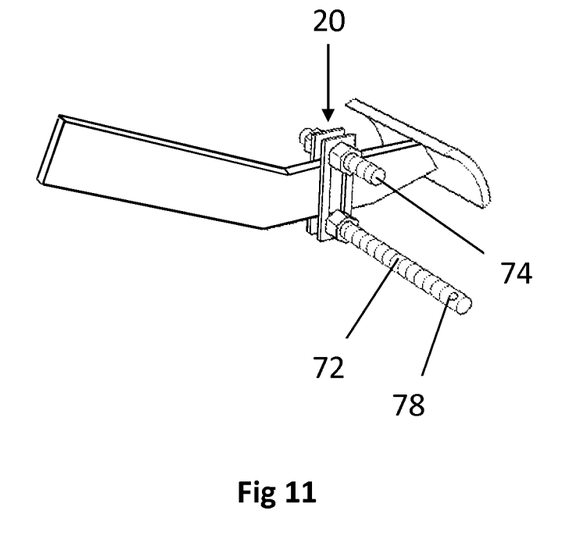
FIG. 11 is a perspective view of a second embodiment of a connecting frame.

FIG. 11 shows a second embodiment of the main brake connecting frame 20. In this embodiment, the position of the bolts 72 and 74 is reversed such that the inner cable 30 will be attached to the bolt 72 under the main brake 18.

Figure 12:
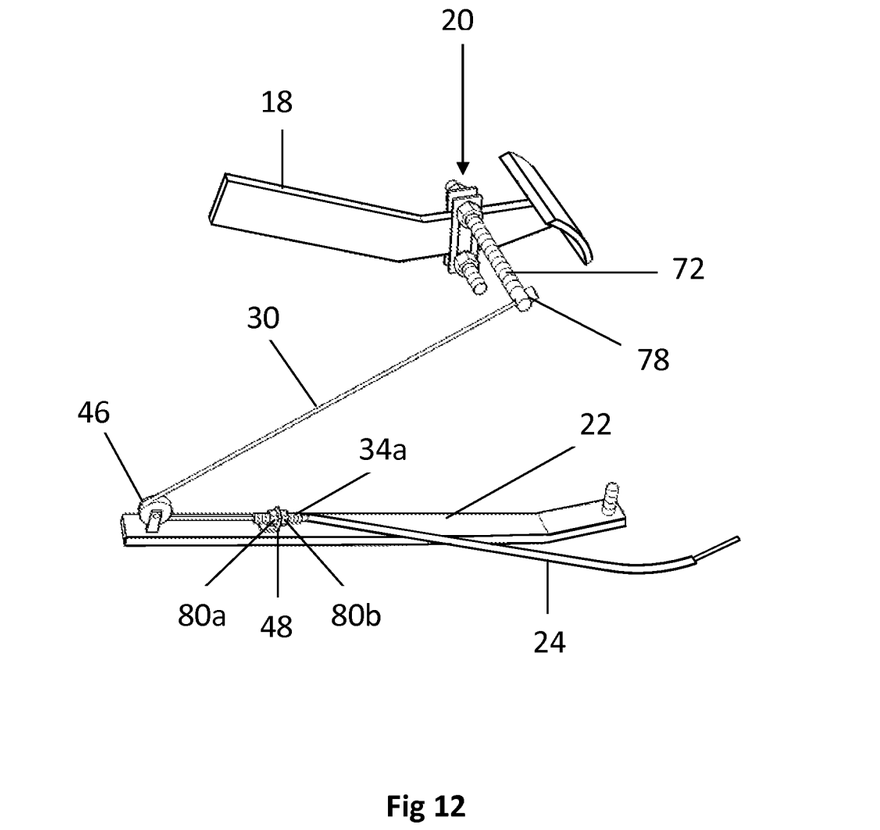
FIG. 12 is a perspective view of an association of a main brake, a connecting frame, a brake cable, and a supporting structure.

FIG. 12 is the association of the main brake 18, the mounting frame 20, the brake cable 24, and the supporting structure 22. The first end of the inner cable 30 travels under the pulley 46, then it is attached to the bolt 72 through the hole 78. The threaded tube 34a of the brake cable 24 is secured to the bored plate 48 with nuts 80a and 80b.

Figure 13A:
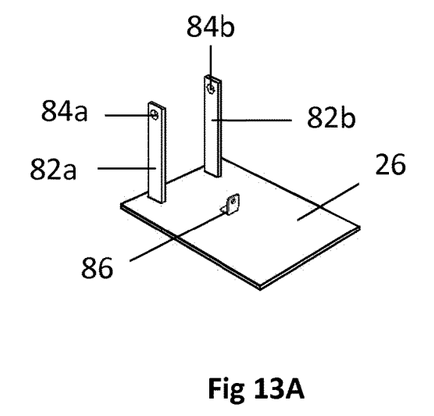
FIGS. 13A to 13C are perspective views of an auxiliary brake assembly.
Figure 13B:
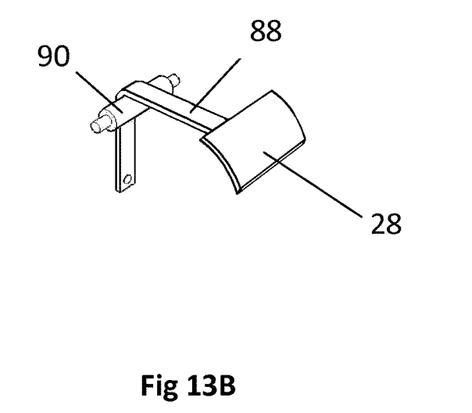
Figure 13C:
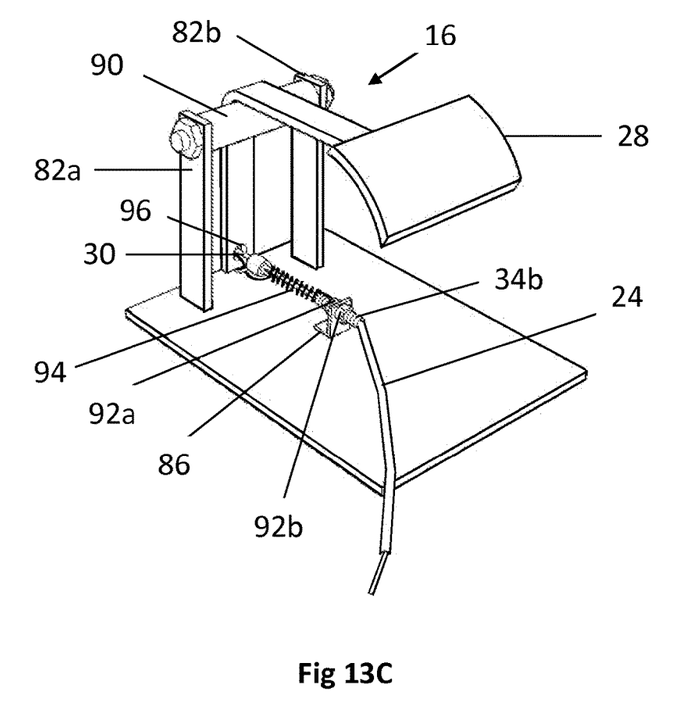

FIGS. 13A, B and C illustrate the auxiliary brake assembly 16. In FIG. 13A, the brake assembly 16 includes at least one and preferably two supporting frames 82a and 82b on a front portion of the base 26. The frames 82a and 82b have a hole 84a and a hole 84b on the top respectively. A bored plate 86 is attached to the base 26 rear to the frames 82a and 82b.

In FIG. 13B, the auxiliary brake pedal 28 includes an angled brake arm 88 with a pedal portion attached to a rear end of the arm 88, and a pivot 90 attached to the corner of the arm 88.

Referring to the FIG. 13C, the pivot 90 is mounted on at least one preferably two of the frames 82a and 82b through the holes 84a and 84b. The threaded tube 34b of the brake cable 24 is secured to the bored plate 86 with nuts 92a and 92b. The other end of the inner cable 30 is threaded through coils of an extension spring 94, and then secured to a lower end of the arm 88 through a hole 96. A front end of the spring 94 is hooked on the lower end of the arm 88 through the hole 96 with a rear end hooked on the bored plate 86. At present I contemplate the use of the lower end of the arm 88 and the bored plate 86 for securing both ends of the spring 94, however other structures such as the inner cable 30, the threaded tube 34b, etc. are also suitable. The spring 94 will maintain the auxiliary brake pedal 28 in its original position when the pedal 28 is not depressed, and will help the depressed pedal 28 and the main brake 18 return to their original position when the pedal 28 is released.

Operation

It should be understood that a strong support must be established for an auxiliary brake control system to be effective. In present art, a driver-seat-bracket, a conventional component of a vehicle, is an ideal structure to establish a steady and reliable support without drilling or welding. As shown in FIG. 1, the supporting structure 22 is securely installed on the driver-seat-bracket 12.

In operation, the mechanism of the auxiliary brake control system can be illustrated by the auxiliary brake assembly 16, which mimics motions of the main brake 18: with an action of depressing the auxiliary brake pedal 28, a full stop or speed reduction of a vehicle will be made. As shown in FIGS. 1, 12 and 13, when the pedal 28 is depressed, it pulls the inner cable 30 on the auxiliary brake pedal 28 forwardly and a brake force is transmitted along the cable housing of the brake cable 24. The pulley 46 converts the brake force on the main brake 18 downwardly and forwardly, which is loaded on the supporting structure 22. Accordingly, the main brake 18 is pulled downwardly and a full or partial brake is achieved. The metallic constitution of the supporting structure 22 has the ability to withstand the brake force without horizontal displacement; though minimal vertical displacement might occur, it will not affect the function of the auxiliary brake control system. When the auxiliary brake pedal 28 is released, the main brake 18 will return to its rest position promptly with the help of the spring 94 and an internal brake spring of a vehicle.

Advantages

From the description above, a number of advantages of the adjustable auxiliary brake control system become evident.

One of the advantages of the present art is that it is easy to install and uninstall the auxiliary brake control system.

Another advantage of the present art is that no drilling or welding is required for the installation.

In addition, the supporting structure mounted on a driver-seat-bracket provides a strong and reliable support.

A further advantage is that the auxiliary brake control system can be universally fitted to different vehicle models. The adjustable supporting structure makes it feasible for the system to be installed in variable vehicle models.

Moreover, the extension spring helps the main brake return to its rest position without delay. One end of the inner cable is threaded through the spring coils. The spring coils serve as a guiding tube and help the bendable inner cable return to the cable housing; accordingly, the main brake can bounce back promptly when the auxiliary brake pedal is released.

CONCLUSION, RAMIFICATION, AND SCOPE

The present invention can be applied to a braking system. With the same principle, the present invention can also be applied to a clutch system and an accelerator system of a vehicle.

While the above description contains many specificities, these should not be construed as limitations on the scope, but rather as an exemplification of the presently preferred embodiments thereof. Many other ramifications and variations are possible within the teachings of the various embodiments. For example, the extension spring can be replaced by a torsion spring, which will be placed around one side of the pivot with one end of the torsion spring attaching to the angled brake arm and the other end to one of the supporting frames.

Thus, the scope should be determined not by the embodiments illustrated, but by appended claims and their legal equivalents.

It is concluded that the auxiliary brake control system controls the main brake by an instructor in the passenger compartment. The auxiliary brake control system has advantages: the device is easy to install and uninstall, there is no permanent structural alteration for installation and the system can be universally fitted to different vehicle models. The arrangement of the extension spring helps the main brake return to its rest position without delay when the auxiliary brake pedal is released.

I claim:

1. An adjustable auxiliary brake control system for an educational driving vehicle having a main brake and a driver seat, said driver seat anchored on a floor board by a bolt through a hole on a driver-seat-bracket at each corner, said auxiliary brake control system comprising:
    (a) an auxiliary brake assembly including a base and an auxiliary brake pedal pivotably attached to said base;
    (b) a connecting frame mounted on said main brake as a linkage between said main brake and said auxiliary brake assembly;
    (c) a supporting structure installed on said driver-seat-bracket by said bolt through said hole into said floor board as a fulcrum for a brake force from said auxiliary brake assembly; and
    (d) a brake cable connecting said auxiliary brake assembly to control said main brake by transmitting the brake force onto said main brake, said brake cable including an outer sheath and an inner cable, said outer sheath having a first end connected to said supporting structure and a second end connected to said base, said inner cable sliding within said outer sheath with a first end secured to said connecting frame on the left and a second end secured to said auxiliary brake pedal, whereby when said auxiliary brake pedal is depressed followed by a movement of said inner cable, the brake force will be applied on said main brake such that said main brake is pulled downwardly to fulfill a brake action.

2. The adjustable auxiliary brake control system according to claim 1 wherein said connecting frame is mounted on an arm of said main brake as a linkage between said main brake and said auxiliary brake assembly, said connecting frame comprising: a first slotted plate, a second slotted plate, a first bolt and a second bolt, said first and second plates attached to the left and right sides of said arm respectively, said first and second bolts going through said slots to form said connecting frame on said arm, said bolts being adjusted and fastened by nuts such that said connecting frame can be adapted to different types of said main brake.

3. The adjustable auxiliary brake control system according to claim 2 wherein said first end of said inner cable is secured to said first bolt through a mounting member, said mounting member including a mounting hole, whereby said first bolt serves as a transverse extension of said arm such that said supporting structure can be placed on the left of said main brake along said floor board of said vehicle to avoid disturbance to a driver.

4. The adjustable auxiliary brake control system according to claim 1 wherein said supporting structure is installed on said driver-seat-bracket by said bolt of said driver seat through said hole of said driver-seat-bracket into said floor board as a fulcrum for the brake force from said auxiliary brake assembly, said supporting structure comprising: a front bracket having a first bolt on a rear portion; a rear bracket having a second bolt on a front portion and a hole in a rear portion, said rear bracket mounted on said driver-seat-bracket by said bolt of said driver seat through said hole of said rear bracket and said hole of said driver-seat-bracket into said floor board; and an intermediate bracket having a slot to connect said front and rear brackets by said first and second bolts with nuts, whereby said intermediate bracket adjusts the length of said supporting structure such that said auxiliary brake control system is adjustable to be adapted to different vehicle models.

5. The adjustable auxiliary brake control system according to claim 4 wherein said rear bracket and said driver-seat-bracket are joined together by a connecting bracket such that said supporting structure can be adapted to any vehicle with said driver-seat-bracket anchored to said floor board indirectly through a frame, said connecting bracket having an upper portion and a lower portion to connect said driver-seat-bracket and said rear bracket respectively, whereby said supporting structure can be kept on said floor board.

6. The adjustable auxiliary brake control system according to claim 4 wherein said front bracket includes a fixed pulley on said front portion, said first end of said inner cable travelling beneath said pulley before attaching to said connecting frame.

7. The adjustable auxiliary brake control system according to claim 4 wherein said front bracket further includes a bored plate on a medial portion, said brake cable fastened on said bored plate through a threaded tube with nuts.

8. The adjustable auxiliary brake control system according to claim 1 wherein said auxiliary brake assembly further includes: at least one supporting frame attached to a front portion of said base; a pivot connected to a top portion of said at least one supporting frame, said auxiliary brake pedal attached to said pivot through an angled arm of said auxiliary brake pedal, said angled arm having a lower portion and an upper portion; and a bored plate rear to said at least one supporting frame, said brake cable fastened on said bored plate through a threaded tube with nuts, said second end of said inner cable attached to said lower portion of said angled arm.

9. The adjustable auxiliary brake control system according to claim 8 wherein said second end of said inner cable is surrounded by an extension spring, whereby said spring will maintain said auxiliary brake pedal in a rest position when said auxiliary brake pedal is not depressed, and will help said inner cable return into said outer sheath such that said auxiliary brake pedal and said main brake will return to rest positions promptly when said depressed auxiliary brake pedal is released.

* * * * *